United States Patent [19]

Schwab

[11] 4,076,374

[45] Feb. 28, 1978

[54] MEANS FOR MAINTAINING VISIBILITY IN THE USE OF MIRRORS SUBJECT TO AQUEOUS DEPOSITS

[76] Inventor: Robert E. Schwab, 16 Ivy Trail, Greenville, S.C. 29607

[21] Appl. No.: 705,255

[22] Filed: Jul. 14, 1976

[51] Int. Cl.² .................. G02B 5/08; E06B 7/12; A47L 1/00; B08B 3/00
[52] U.S. Cl. .......................... 350/63; 52/171; 15/250 B; 15/250.01; 134/113
[58] Field of Search ............ 350/63, 61, 310, 307; 32/69; 128/21; 4/1, 146; 52/171; 15/250 R, 250 B, 250.01, 250.02; 134/111, 113, 201

[56] References Cited

U.S. PATENT DOCUMENTS

| 1,283,164 | 10/1918 | Hammond | 350/307 |
| 1,843,828 | 2/1932 | McNaught | 15/250.01 |
| 3,092,910 | 6/1963 | Warriner | 32/69 |
| 3,637,296 | 1/1972 | McLafferty et al. | 350/310 |
| 3,708,218 | 1/1973 | Smillie | 350/63 |

FOREIGN PATENT DOCUMENTS

| 640,380 | 7/1928 | France | 52/171 |
| 507,916 | 9/1920 | France | 52/171 |
| 723,750 | 4/1932 | France | 15/250.01 |

Primary Examiner—Jon W. Henry
Attorney, Agent, or Firm—Frank H. Wisch

[57] ABSTRACT

In an environment in which a transparent glass member, or in which a mirror, is apt to become coated by condensate or water splashes that interfere with clear visibility of an object or image, means are provided for preventing obscuration. A device is provided which includes a continuously flowing film of a transparent, aqueous fluid across the face of the transparent member or mirror. By using a flowing film, no condensate or water splashed on the transparent member or the mirror renders it impossible for use. It is made possible, for example, to shave while taking a hot shower, or to see clearly out of doors through windows that otherwise become cloudy by formation of condensate.

4 Claims, 9 Drawing Figures

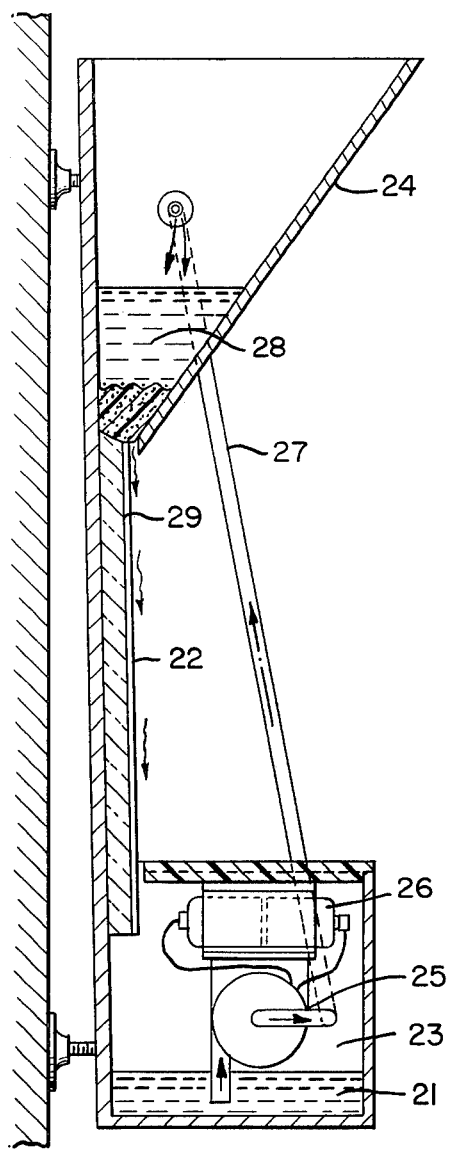
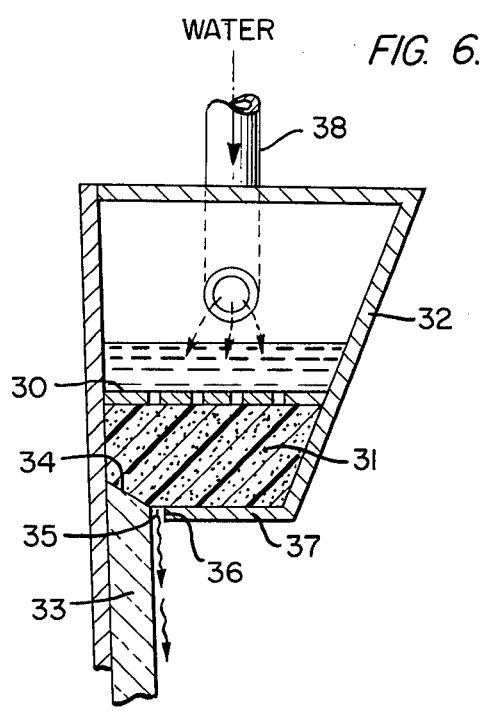
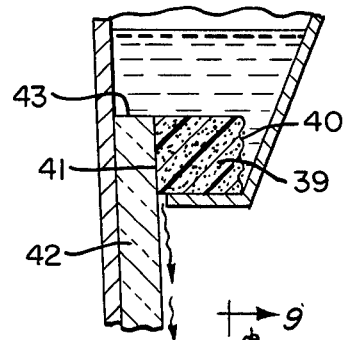
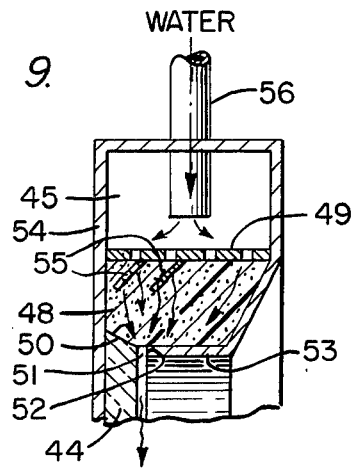
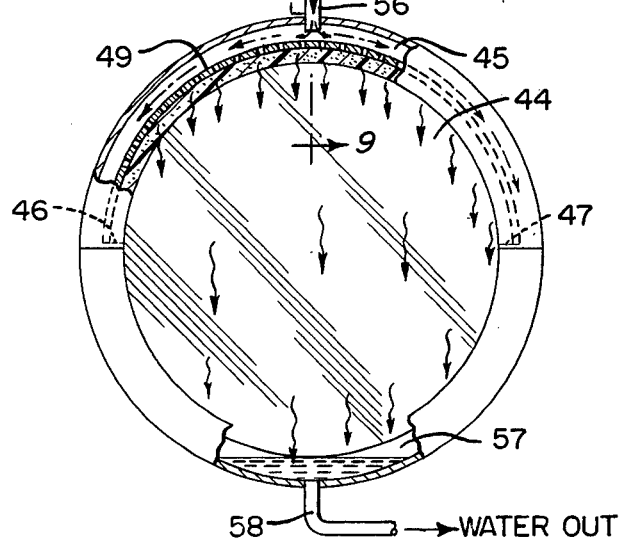

MEANS FOR MAINTAINING VISIBILITY IN THE USE OF MIRRORS SUBJECT TO AQUEOUS DEPOSITS

The present invention relates to improvements in methods and means for prevention of clouding of surfaces of mirrors or transparent members caused by condensation of aqueous vapor, or water splattering which results in interference with visibility of objects in the mirror or through a transparent member.

It is well known, for example, that when hot water is turned on in a room, such as a bathroom, it becomes impossible to see oneself in a mirror or to see through a window pane. By means of the present invention this can be avoided. It has now become possible to provide a mirror for use in shaving while taking a shower bath.

An object of the present invention is to provide a reflecting or transparent member having means on a surface which prevents obscuration of images.

Another object is to provide means such as a continuously flowing film of a transparent aqueous fluid which while flowing across the face of a reflecting member, such as a mirror, or a transparent member, such as a window pane, will prevent water in droplets, which come into contact with the film, from obscuring or rendering invisible any object that would normally be visible in the use of said member.

A further object is to provide water flow in film form on a flat, transparent glass surface, or on a metal or a glass mirror surface whereby, when used in an environment in which condensate or splatter contacts such surfaces, there results no, or negligible distortion of image in refraction or reflection. A primary use of the invention is in hot water showers, as well as industrially on windows, on dial faces and in other or similar locations. Use is also found in the medical field, or in dentistry for dental mirrors.

Further objects will be apparent from the following description of the invention, with reference to the drawings, wherein:

FIG. 5 is a sectional view of a modification;

FIG. 6 is a sectional view showing a modification of means for applying a water film;

FIG. 7 is a sectional view of a further modification of means for applying a water film;

FIG. 8 is a front elevation of a circular modification; and

FIG. 9 is a sectional view on line 9—9 of FIG. 8.

Figure 1:
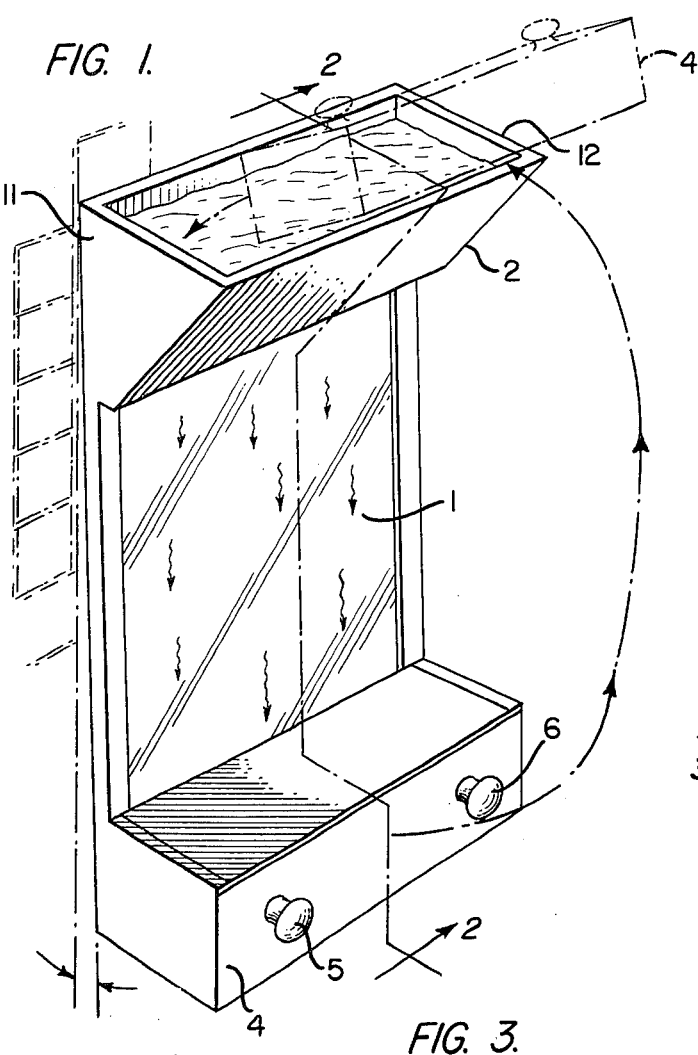
FIG. 1 is a perspective view of a preferred embodiment as applied to a device for use in a home shower.
Figure 2:
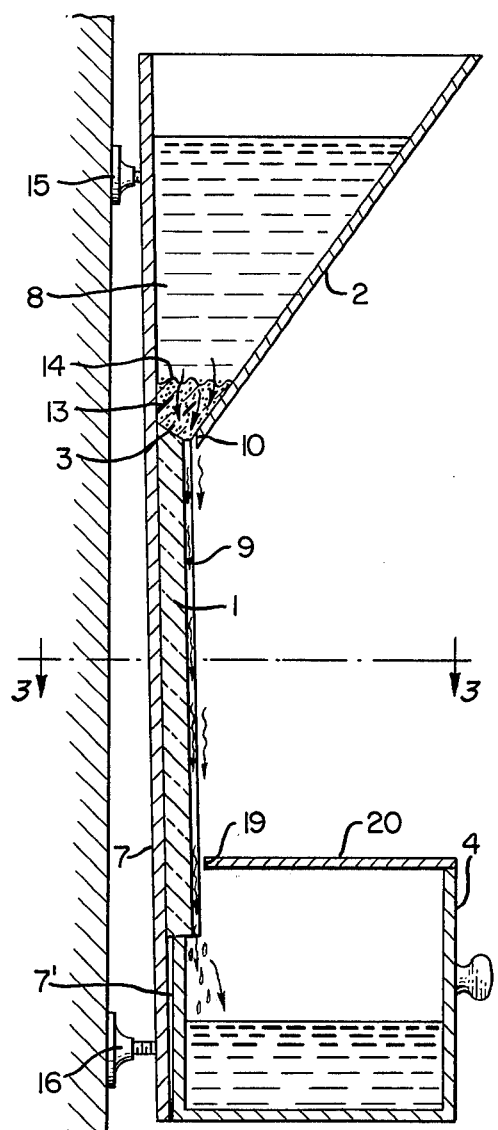
FIG. 2 is a vertical sectional view on line 2—2 of FIG. 1.

Referring to FIGS. 1 to 4, an illustration of the application of the invention to a mirror 1 in a shower bath is shown. The mirror may be one of glass or polished metal for reflection, rectangular in shape, supported in substantially vertical position, and having an outwardly exposed, flat, smooth surface.

A trough 2 is at the upper end 3 of the mirror 1. The lower end of the mirror may be free but a receiving chamber in the form of a sliding drawer 4 with knobs 5 and 6 is preferably provided. A backing 7 behind the mirror 1 serves to support the trough and drawer in spaced relation. A prop 7' serves additionally to maintain the lower edge of the mirror 1 spaced from the bottom of the drawer 4.

Water 8, or a clear aqueous liquid from the trough 2, serves to form a film 9 on the face of the mirror 1. To form the film 9 and spread the water uniformly, with negligible or no distortion of the film, the rate of feed of water to the face of the mirror may be controlled or adjusted, or for example, the front wall of the trough 2 is inclined downwardly toward the upper edge 3 of the mirror 1; the lower edge 10 of the front wall of the trough 2 extends across at the upper edge of the mirror 1 from side wall 11 to side wall 12 of the trough, and is positioned close to the edge 3 to serve in forming the film 9. A strip of sponge material 13 or other equivalent material is placed across the bottom of the trough and is maintained under slight pressure by placing a pressure screen 14 across the top of the sponge strip 13. The sponge is maintained under slight pressure by pushing down on the screen 14 to serve in spreading the water on the mirror surface and to provide uniform, even flow of the liquid.

If desired, the surface of the mirror may be canted slightly to cause the liquid to flow at a slower rate. The rate should preferably be as slow as possible and yet it should be such as to obtain adequate surface coverage by a film. The canting is not necessary but when applied and the cant or the angle to a vertical wall is about 2° to 4°, it enhances distribution of the film on a glass or metal surface. To space and attach the mirror 1, suction cups 15 and 16 are attached to the backing. The cups are adjustable to provide a desired spacing and angular position of the mirror.

Figure 3:
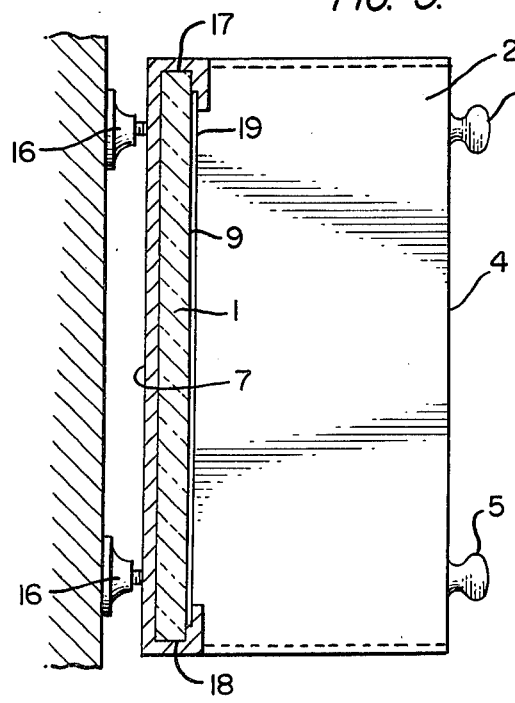
FIG. 3 is a horizontal sectional view taken on line 3—3 of FIG. 2.
Figure 4:
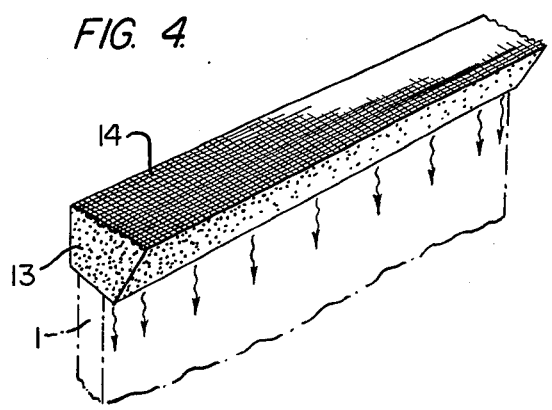
FIG. 4 is a perspective view of an element shown in FIG. 2.

In FIG. 3, the backing 7 is shown molded around the side edges at 17 and 18 of the mirror 1 thereby limiting the spread of the film and preventing the flow of water sideways off the mirror surface. The water in the film 9 flows downward, as indicated by arrows, and past the edge 19 of the top cover 20 of the drawer 4 which edge is spaced from the surface of the mirror 1 just enough to allow the film 9 to flow into the drawer 4.

In the use of the above apparatus in a shower while shaving, personal articles needed for shaving may be conveniently placed on the cover 20. Water that collects in the drawer 4 may, from time to time, be transferred to the trough 2 by manual removal of the drawer and lifting it up to the trough into which the water can be decanted. As the water in film form slowly gravitates on the mirror surface, the person shaving finds no difficulty in seeing himself in the mirror. Clouding that usually results from condensation of steam from hot water is eliminated.

As shown in FIG. 5, a pump means may be provided to transfer water 21 collected, from a flowing film 22, in a chamber 23 to a trough 24 such as trough 2. A pump 25 combined with a source 26 of power may be enclosed in the chamber 23. Water from the chamber 23 is pumped into the trough 24 through a pipe 27. The water 28 in the trough 24 passes downwardly and a film 22 is formed on the mirror surface 29.

As shown in FIGS. 6 and 7, the means for forming a film on the mirror shown in FIGS. 1 to 5, may be varied. In FIG. 6, a perforated metal wall 30 is placed across the top side of a sponge 31 placed in the bottom of a trough or chamber 32. The sponge 31 is preferably compressed slightly to serve in forming a film on the mirror 33. The top edge 34 of the mirror is slanted downward toward the thin space 35 through which the water passes between the edge 36 of the bottom wall 37 and the mirror 33. Water is introduced through a pipe 38.

In FIG. 7, the sponge 39 is shown on the bottom of a trough similar to that shown in FIG. 6, and is under slight pressure of a screen 40 which presses the sponge 39 directed toward the surface 41 of the mirror 42 adjacent the upper edge 43 thereof.

In FIGS. 8 and 9 a circular mirror 44 is shown with an annular passage 45 extending around the upper edge to diammetrically opposite points 46 and 47. A sponge 48 is positioned in the passage 45 and is slightly pressed, with a perforated plate 49 over the upper surface of the sponge, toward the edge 50 of the mirror 44 from adjacent the point 46 to adjacent point 47 to feed water from the passage 45 into the film-forming slit 51 between the edge 52 of the wall 53 that extends to adjacent the upper edge of the mirror 44. The upper edge of the mirror 44 is preferably slanted from the backing 54 downwardly toward the slit 51. Baffle plates 55, directed downwardly from the perforated plate 49 toward the mirror, serve to direct and distribute the water, introduced through pipe 56, toward the slit 51. Water from the film distributed on the face of the mirror 44 and passing downwardly over it, is collected in an annular space 57 around the lower portion of the edge of the mirror. Water is withdrawn from the space 57 through a pipe 58, and, if desired, may be recirculated for use on the mirror.

Inasmuch as the present invention is subject to variation, modifications and changes in detail, it is intended that all matter described above or shown in the accompanying drawings be interpreted as illustrative and not in a limiting sense.

I claim:

1. Means including a surface-coating device and a mirror member having an exposed exterior surface and an upper edge inclined toward said surface, for preventing obscuration of an image due to condensation of vapor and splashing of water on the exposed surface of said mirror member, and including means for applying water to an upper level of said surface while in vertical position and for forming a flowing film of water on said surface, means for withdrawing water from said film at a lower level of said surface, means for returning the water to said water-applying means at said upper level, a strip of sponge material adjacent said water-applying means at said upper level, the said strip having a side edge against the edge of said member.

2. Means, as set forth in claim 1, including means compressing said sponge material to control the rate of flow of water for maintaining the formation of the said film with minimum or no distortion.

3. Apparatus comprising a mirror having means for supporting it in substantially vertical position, a trough for introducing water therefrom to an edge of the mirror, the said trough having a slit in the bottom thereof for forming a water film on the said mirror, a sponge in the bottom of the trough over the said slit, and a screen in position over the said sponge, said screen pressing against the top of said sponge.

4. Apparatus, as set forth in claim 3, in which the said screen comprises a perforated solid plate.

* * * * *